United States Patent [19]
Buckmaster et al.

[11] Patent Number: 5,712,318
[45] Date of Patent: Jan. 27, 1998

[54] TWO-PART NUCLEATING AGENT SYSTEM

[75] Inventors: Marlin Dwight Buckmaster, Vienna, W. Va.; Donald Leonidas Henry, Elkton, Md.; Stuart Karl Randa, Wilmington, Del.

[73] Assignee: E. I. Du Pont de Nemours and Company, Wilmington, Del.

[21] Appl. No.: 742,421

[22] Filed: Oct. 30, 1996

Related U.S. Application Data

[63] Continuation-in-part of Ser. No. 631,726, Apr. 10, 1996.
[51] Int. Cl.$^6$ .................... C08J 9/00; C08J 9/04
[52] U.S. Cl. .................... 521/85; 521/79; 521/81; 521/89; 521/92; 521/134; 521/142; 521/143; 521/145
[58] Field of Search .................... 521/142, 143, 521/145, 89, 92

[56] References Cited

U.S. PATENT DOCUMENTS

| | | | |
|---|---|---|---|
| 3,072,583 | 1/1963 | Randa | 521/145 |
| 4,764,538 | 8/1988 | Buckmaster et al. | 521/85 |
| 4,877,815 | 10/1989 | Buckmaster | 521/85 |
| 5,023,279 | 6/1991 | Buckmaster et al. | 521/85 |

*Primary Examiner*—Morton Foelak

[57] ABSTRACT

A foam cell nucleating agent that is a combination of sulfonic or phosphonic acid or salt thereof and inorganic salt containing a polyatomic anion yields improved foaming of thermoplastic resins such as polyolefins and melt-fabricable fluoropolymers.

11 Claims, No Drawings

TWO-PART NUCLEATING AGENT SYSTEM

RELATED APPLICATIONS

This application is a continuation-in-part of application Ser. No. 08/631,726, filed Apr. 10, 1996.

FIELD OF THE INVENTION

This invention is in the field of foamed thermoplastic resin, providing an improved nucleation system for such resin.

BACKGROUND OF THE INVENTION

Conductive wire is often used to transmit electronic signals. The wire must be protected, or insulated, and thermoplastic coatings extruded from a molten state onto and around the wire are ordinarily used for this purpose. The thermoplastic materials are selected on the basis of several criteria including high dielectric strength, low dielectric constant, and low dissipation factor. It has previously been found that if the thermoplastic material is foamed as it is applied to the wire, the dielectric constant is desirably reduced due to the formation of numerous small non-interconnected cells in the foam. U.S. Pat. No. 3,072,583 discloses a nucleated foaming process for extruding perfluorinated polymer foam around transmission wire with a dissolved gas blowing agent. Foamed insulation using other thermoplastic materials, especially polyolefins, is also widely known.

Foams are also useful in applications other than wire insulation. Examples of foam structures include foamed sheet for electrical insulation, thermal insulation, and cushioning; foamed pipe and tubing; and injection molded pieces.

A nucleating agent is needed in the foaming process to achieve a uniform, small cell structure. A preferred art-recognized nucleating agent for fluoropolymer resins is boron nitride (BN), an inert white ceramic powder. A 0.5–2.0 wt % loading of BN alone is typically used to provide foam cell nucleation in fluoropolymer resins.

U.S. Pat. No. 4,764,538 discloses synergistic combinations of BN and certain inorganic salts which give greatly enhanced foam nucleation in fluoropolymers. This combination not only allows a significant reduction in the amount of BN needed but also gives improved foam in terms of smaller cells. Improved capacitance uniformity and dimensional uniformity are also attained. However, the BN is costly, even at the lower concentrations that can be used in conjunction with the inorganic salts.

U.S. Pat. No. 4,877,815 discloses a class of sulfonic and phosphonic acids, and salts of the acids, which give very efficient foam cell nucleation in a wide variety of thermoplastic materials at low concentrations. Additionally, as disclosed therein, these acids and salts are beneficially used in minor amounts in conjunction with BN. As additionally disclosed therein, these acids and salts are also beneficially used in conjunction with BN and calcium tetraborate together, i.e., a combination covered by U.S. Pat. No. 4,764,538.

With the sulfonic and phosphonic acids and salts as nucleating agent, control of foaming can be temperature sensitive, with high melt temperature tending to yield small cells but unstable extrusion and low melt temperature tending to yield stable extrusion but large foam cells. Additionally, the point at which foaming occurs in extrusion foaming of fluoropolymer resins can be variable. That is, foam cell nucleation, as detected visually, can begin at various distances from the extrusion die. Extrusion, including extrusion foaming, techniques for fluoropolymers commonly incorporate melt draw, the drawing down of a cone of molten resin from a larger die into contact with the wire. If, in extrusion foaming, foam cell nucleation occurs in the melt cone, at least to the extent of visual detection, the process is less stable and the instability can be reflected in variations in foam extrudate properties, e.g., in dimensional variability or in capacitance variability. In extreme instances, tearing of the melt cone can cause catastrophic failure.

With BN in effective foam cell nucleating amount, it is believed that nucleation or incipient nucleation in the melt cone contributes to instability, but the pigmenting effect of the BN prevents observation of the point at which foaming occurs.

Further improvement in foaming efficiency, e.g., reduction in foam cell size and improvements in capacitance and dimensional uniformity, are desired for thermoplastic resins in general. This is especially so for smaller wire constructions of interest in the electronics field, so that, for example, foam cell dimensions will be small with respect to the radial dimension of the thin insulation. While the sulfonic and phosphonic acids, and salts of the acids, in the amounts used are more economical than BN, the problem remains as to how to stabilize the foaming of fluoropolymer resin extrudate so that foam cell nucleation occurs beyond the melt cone when using these acids and salts as nucleating agents to obtain small foam cells.

SUMMARY OF THE INVENTION

It has been discovered that inorganic salts such as calcium tetraborate can be used in conjunction with sulfonic and phosphonic acids and salts to obtain improved foaming stability, uniformity, and reduced foam cell size.

This invention provides an improved foamable thermoplastic resin composition, comprising thermoplastic resin and a nucleating agent system consisting essentially of at least one sulfonic or phosphonic acid or salt of the acid and at least one inorganic salt containing a polyatomic anion. Use of the combination foam nucleating agent system leads to uniformity, substantially reduced foam cell size and/or enhanced control of the point at which foaming occurs in extrusion foaming of fluoropolymer resins.

In another aspect, the invention provides an improved process for foaming thermoplastic resin, wherein the improvement comprises using the improved combination nucleating agent as described above. In this process, the foaming is carried out in the absence of boron nitride.

The invention also provides foam structures made by the improved process of this invention.

DETAILED DESCRIPTION

It has been discovered that the foaming of thermoplastic resins can be improved if a foam cell nucleating agent consisting essentially of a combination of at least one inorganic salt containing a polyatomic anion and at least one sulfonic or phosphonic acid or salt of the acid is used. With this nucleating agent system, stable extrusion foaming of thermoplastic resins and small foam cell sizes can be achieved.

As illustrated by the Examples to follow, the nucleating agent system of this invention permits the point at which foaming occurs in extrusion foaming to be adjusted to a desired location, and yet achieve very small foam cell dimensions. For extrusion foaming of thermoplastic resins e.g. fluoropolymer, in which the melt draw technique is commonly employed, this desired location, as defined by visual observation of the appearance of foam cells, is downstream from the apex of the melt cone that is drawn onto the moving wire. Additionally, this control permits the development of extremely fine cell structure. As shown in Example 10, average foam cell diameters of only 0.015 mm have been achieved. Since foam cell volume varies with the inverse third power of cell diameter, such small cells translate to extremely high cell counts at given void fraction, e.g., in excess of $100 \times 10^6$ cells/cm$^3$ at only 25% voids.

The inorganic salts that can be used in this invention are selected from those disclosed in U.S. Pat. No. 4,764,538. Briefly, they are inorganic salts stable at the temperature of thermoplastic resin extrusion, having metal cations, having polyatomic anions, and satisfying the following relationships:

$$0.36[14-pKa]-0.52 \geq [r-0.2q]^2 \geq 0.11[14-pKa]-0.28$$

and $$3 \geq [14-pKa] \geq 10$$

wherein:

r=crystal ionic radius of the cation, in angstrom units
q=valence of the cation
pKa=−logKa
Ka=equilibrium ionization constant of the anion acid. Crystal ionic radius values and pKa values can be found in CRC Handbook of Chemistry and Physics, 671th Edition published by CRC Press, Inc. (1986), page F-157 for ionic radius and page D-163 for pKa values. Suitable inorganic salts include calcium carbonate and the tetraborates of sodium, potassium, and calcium. Tetraborate is a preferred polyatomic anion.

The sulfonic and phosphonic acids, and salts thereof, that can be used in this invention include those disclosed in U.S. Pat. No. 5,023,279. Such compounds include the hydrocarbon acids and salts such as sodium P-toluene sulfonate, potassium methane sulfonate, and barium propane sulfonate. Such compounds also include the free acids and salts of partially or totally fluorinated aliphatic sulfonic and phosphonic acids, which optionally may contain cycloalkyl groups and/or ether oxygen, and the free acids and salts of aromatic sulfonic and phosphonic acids in which the aromatic ring, optionally, is substituted with alkyl, fluorine-containing alkyl, and/or hydroxyl groups. Preferred compounds include those having the formula

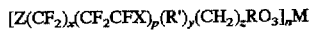

wherein the bivalent groups, except for RO$_3$, may be present in any sequence;
Z is CCl$_3$, CCl$_2$H, H, F, Cl or Br;
each X, independently, is selected from H, F, Cl and CF$_3$;
R is selected from sulfur and phosphorus;
M is selected from H and a metallic, ammonium, substituted ammonium and quaternary ammonium cation;
each of x and z, independently, is an integer and is 0 to 20;
p is an integer and is 0 to 6;
y is 0 or 1;
x+y+z+p is a positive integer, or, if x+y+z+p is 0, then Z is CCL$_3$ or CCl$_2$H;

n is the valence of M; and
R' is selected from a C5-6 perfluorinated alicyclic ring diradical; a C$_{1-16}$ perfluorinated aliphatic polyether diradical with repeat units selected from [CF$_2$O], [CF$_2$CF$_2$O], and [CF$_2$CF(CF$_3$)O]; and a substituted or unsubstituted aromatic diradical, in which case Z is H.

Suitable such compounds include the potassium, barium, and calcium salts of perfluoroalkane sulfonic acids and perfluoroalkyl ethane sulfonic acids, in both of which the perfluorinated group contains 1–10 carbon atoms.

The thermoplastic resins useful in the present invention include all such resins that can be foamed by a gas injection process and/or by use of a chemical blowing agent. Preferred resins, include fluoropolymers and polyolefins. Such foaming processes are described in the prior art. See, for example, U.S. Pat. Nos. 4,764,538 and 5,023,279.

More specifically, the fluoropolymer resins useful in the present invention are organic polymeric compounds containing at least 35 wt % fluorine and are melt-fabricable. As such, they generally have a melt flow rate (MFR) of about 1–100 g/10 min as measured according to ASTM D-1238 at the temperature appropriate to each resin. Preferred MFR is in the range 5–25 g/10 min.

Preferred examples of such fluoropolymers are:

(a) homopolymers of chlorotrifluoroethylene (CTFE), 2,2-difluoroethylene, or vinylidene fluoride, or (b) copolymers of tetrafluoroethylene (TFE) and one of the monomers in (a), or (c) copolymers of at least one of the monomers in (a) or (b) and one or more monomers selected from the group consisting of ethylene (E), terminally unsaturated perfluoroolefins having 3–8 carbon atoms, perfluoro(alkyl vinyl ethers) (PAVE) having 3–8 carbon atoms, perfluoro(alkoxy alkyl vinyl ether) having 5–12 carbon atoms, and perfluoroalkyl ethylene having 3–8 carbon atoms.

Especially preferred fluoropolymers are the copolymers TFE/hexafluoropropylene, optionally including one or more additional monomers; TFE and at least one perfluoro(alkyl vinyl ether) selected from perfluoro(methyl vinyl ether), perfluoro(ethyl vinyl ether), and perfluoro(propyl vinyl ether); E/TFE including E/TFE/perfluorobutyl ethylene; E/CTFE; and polyvinylidene fluoride.

The broad applicability of the invention is further demonstrated in the examples using polyolefins as the thermoplastic resin. Examples of polyolefins include, but are not limited to, polyethylene, linear and branched, low density and high density. Blends of polyethylene, and blend of polyethylene or polyethylenes with other thermoplastic resins are operable herein. Typically, the polyolefin will have a VICAT softening point of 85° to 130° C.

Thermoplastic resin, inorganic salt, and sulfonic or phosphonic acid or salt thereof can be combined in several ways to achieve foamable compositions, or concentrates that can be diluted to foamable compositions. For example, thermoplastic resin in powder or cube form, inorganic salt, and acid can be dry blended in desired proportions and melt extruded to obtain a compounded composition. Alternatively, individual concentrates of inorganic salt in thermoplastic resins and of sulfonic or phosphonic acid or salt thereof in thermoplastic resin can be blended with thermoplastic resin and then extruded to the desired composition. In the foregoing case, the thermoplastic resin used in the two components of the blend will normally be the same, but can be different if the different thermoplastic resins are compatible. Alternatively, the inorganic salt in powder form can be combined with an acid concentrate and the thermoplastic resin. Alternatively, one component of the nucleating agent system can first be incorporated into the thermoplastic resin by extrusion, and then the second component of the nucleating agent system can be added. And so on.

The concentrations of inorganic salt and sulfonic or phosphonic acid or salt will be in effective foam cell nucleating amounts that will depend on the foam structure being produced, the specific resin being used, and the salt(s) or acid(s) chosen. For the foamable thermoplastic resin compostions of this invention, each inorganic salt has an optimal concentration mainly in the range 25–1000 ppm by weight, based on weight of polymer resin, and generally 50–500 ppm. Polymers having very high dielectric constant may require even higher levels of inorganic salt, e.g., 3000 ppm. The concentration of sulfonic or phosphonic acid or salt thereof is generally 50–8000 ppm, based on weight of polymer resin, and preferably 250–3000 ppm. More than one type of inorganic salt and/or sulfonic or phosphonic acid or salt thereof can be used, with combined concentrations as recited above, but generally a single type in each category selected for the particular foam nucleating agent system is used.

When a foamable composition concentrate is prepared, the concentrations of the components of the foam nucleating agent system are usually some multiple of the concentrations recited above. It is convenient to make concentrates with concentration of nucleating agent 10× the concentration desired for the foamable extrusion composition, in which case one part of the concentrate is blended with nine parts of natural resin, i.e., resin containing no nucleating agent. While the natural resin should at least be compatible with the resin used in the concentrate, it need not have the same chemical composition or be of the same grade. However, it is common to use a natural resin of the same grade used as the matrix for the concentrate.

The foamable thermoplastic resin compositions of this invention are useful for making foam structures, especially foamed wire insulation having a wall thickness of 0.005–0.075 in. (0.13–1.9mm), most especially foamed wire insulation having wall thickness in the range 0.005–0.020 inch (0.13–0.51 mm). Foam structures are another aspect of this invention.

EXAMPLES

Foamable fluoropolymer resin concentrate compositions used in the following examples were prepared by combining resin pellets and additives in desired proportions in a polyethylene bag, blending well by shaking and kneading by hand, and then extruding on a 28-mm Werner & Pfleiderer twin screw extruder with a strand cutter to pelletize. The concentrate pellets were blended with pellets of natural fluoropolymer resin in desired proportions and the pellet blend was fed to the wire coating extruder hopper. Concentrations of additives are calculated and expressed based on weight of fluoropolymer resin, and are given based on the foamable extrusion composition. The concentrations of additives in concentrates were generally 10× the concentrations in the extrusion compositions, so the ratio of natural resin to concentrate was 9/1.

Fluoropolymer resins and additives for foamable extrusion composition concentrates, or an extrusion composition at final foaming concentration in one instance, for the Examples and Controls are identified in Table 1. Unless otherwise stated, when a foamable extrusion composition concentrate was prepared, a different lot of the same fluoropolymer resin grade was normally employed to let down (dilute) the concentrate to a foamable extrusion composition. No further note of this fact is made herein. MFR values given in the individual examples are for the natural resin used, i.e., for the major resin component of the foamable extrusion composition.

TABLE 1

Fluoropolymer Resins and Nucleating Agents

| Code | Identification or Description |
| --- | --- |
| FEP | Copolymer of TFE and HFP, ASTM D-2116 Type I (Teflon ® FEP fluoropolymer resin grade 100, DuPont). |
| ECTFE | Copolymer of ethylene and chlorotrifluoroethylene having MFR of 20 g/10 min at 275° C. and dielectric constant of 2.7 (Halar ® grade 500, Atochem). |
| CaTB | Calcium tetraborate. |
| KTB | Potassium tetraborate. |
| NaTB | Sodium tetraborate |
| BaS-10 | Barium salt of a mixture of perfluoroalkyl ethane sulfonic acids, perfluoroalkyl group 10 carbon atoms average (CAS No. 1C3-56-0). |
| KS-8 | Potassium perfluorooctane sulfonate (Fluorad ® FC-95, 3M). |

As well known to those skilled in the art, foaming results vary with equipment, extrusion conditions, and foaming method as well as with resin, nucleating agent, and nucleating agent concentration. Thus, it is possible for poor results in one set of tests to be better than good results in another set of tests.

In the following examples the foaming process was a continuous gas injection foaming process carried out using nitrogen as the blowing agent. Other known blowing agents could be used to give substantially the same results. High-pressure (see U.S. Pat. No. 3,975,473, for example) gas injection was used, with two injection ports separated by about 15 cm along the barrel, unless otherwise specified. A Nokia-Maillefer 45-mm extrusion wire line was used in a melt draw extrusion technique. The extruder, having length/diameter ratio of 30/1, was equipped with a screw designed for foaming operations. Extruder screw design allowed for the gas injection and had a mixing torpedo (U.S. Pat. No. 3,006,029) to provide a uniform melt. Details of the extrusion conditions are given in Table 2. Unless otherwise specified, a B&H 30 crosshead was used. Wire sizes in Table 2 are given in AWG. AWG 22 has diameter of 0.025 inch (0.64 mm). AWG 23 has diameter of 0.023 inch (0.57 mm).

TABLE 2

Extruder Detail and Extrusion Conditions

|  | I | II |
| --- | --- | --- |
| Extruder |  |  |
| Die diameter (mm) | 3.00 | 4.22 |
| Guide tip diameter (mm) | 1.52 | 1.91 |
| Temperatures (°C.) |  |  |
| Rear | 238 | 363 |
| Center rear | 246 | 366 |
| Center | 249 | 366 |
| Center front | 249 | 366 |
| Front | 249 | 366 |
| Clamp | 249 | 343 |
| Adapter | 249 | 329 |
| Crosshead | 246 | 316 |
| Die | 257 | 313 |
| Melt | 246 | 357 |
| Wire preheat | 177 | slight |

TABLE 2-continued

Extruder Detail and Extrusion Conditions

|  | I | II |
|---|---|---|
| Running conditions |  |  |
| Screw speed (rpm) | 9.5 | 24.4 |
| Nitrogen pressure (MPa) | 9.5/11.1 | 23.5/24.9 |
| Crosshead pressure (MPa) | 50 | 11.8 |
| Wire size (AWG) | 23 | 22 |
| Wire speed (m/min) | 126 | 45 |
| Melt cone length (mm) | 3 | 25 |
| Air gap to water quench (m) | 12 | 12 |

Foam extrudate was characterized as follows. Capacitance and diameter of the foamed wire insulation were measured and recorded using the in-line monitoring devices with which Nokia-Maillefer extrusion lines are equipped. Values given below are the average values and the average amplitudes of variation estimated from the strip chart record. Dielectric constant was calculated from average capacitance and average wire dimensions. In turn, void fraction was calculated from calculated dielectric constant and the known dielectric constants of air and the fluoropolymer resin used. Average foam cell size was determined at radial mid-wall of the foamed wire insulation by visual examination under a microscope equipped with a vernier eyepiece or by taking a photograph of a thin section of the foam at 25–40× magnification and measuring cell size on the photograph.

EXAMPLES 1–2 and Control A

ECTFE was extruded and foamed using conditions I of Table 2. The nucleating agent system was 2500 ppm of KS-8 and varying amounts of CaTB as shown in Table 3. Results are also summarized in Table 3. These results show that the two-component nucleating agent system of this invention yields significantly improved dimensional uniformity of the resultant foam structure.

TABLE 3

Extrusion Results for Examples 1–2 & Control A

| Example | A | 1 | 2 |
|---|---|---|---|
| Nucleating agent |  |  |  |
| KS-8 (ppm) | 2500 | 2500 | 2500 |
| CaTB (ppm) | 0 | 100 | 400 |
| Extrudate properties |  |  |  |
| Foam diameter (mm) | 1.06 ± 0.020 | 1.05 ± 0.005 | 1.05 ± 0.013 |
| Capacitance (pF/m) | 59.7 ± 0.23 | 59.7 ± 0.23 | 61.7 ± 0.23 |
| Dielectric constant | 2.00 | 1.95 | 1.94 |
| Ave. foam cell size (mm) | ≈0.02 | ≈0.02 | ≈0.02 |
| Voids (%) | 30 | 32 | 32 |

Examples 3–4 and Control B

FEP was extruded and foamed using conditions II of Table 2. The nucleating agent system was 800 ppm of BaS-10 and varying amounts of CaTB as shown in Table 4. Results are also summarized in Table 4. "Out-of-round" is the difference between maximum and minimum diameter of the extrudate, expressed relative to the average diameter. These results show that the two-component nucleating agent system of this invention yields improved capacitance uniformity, foam cell size, and dimensional control.

TABLE 4

Extrusion Results for Examples 3–4 & Control B

| Example | B | 3 | 4 |
|---|---|---|---|
| Nucleating agent |  |  |  |
| BaS-10 (ppm) | 800 | 800 | 800 |
| CaTB ppm) | 0 | 25 | 100 |
| Extrudate properties |  |  |  |
| Foam diameter (mm) | 2.29 ± 0.020 | 2.31 ± 0.025 | 2.36 ± 0.025 |
| Out-of-round (%) | 4.4 | 1.6 | 1.6 |
| Capacitance (pF/m) | 59.7 ± 0.66 | 60.7 ± 0.33 | 59.0 ± 0.33 |
| Dielectric constant | 1.37 | 1.40 | 1.38 |
| Ave. foam cell size (mm) | 0.15 | 0.15 | 0.07 |
| Voids (%) | 58 | 55 | 57 |

Examples 5–8

FEP was extruded and foamed essentially using conditions II of Table 2, except that die diameter was 4.32 mm, guide tip diameter was 1.91 mm, screw speed was 26.3 rpm, and wire speed was 61 m/min. The nucleating agent system was 100 ppm of CaTB and 800 ppm of various salts of a mixture of perfluoroalkyl ethane sulfonic acids, wherein the average perfluoroalkyl group had 8 carbon atoms. The different cations used are given in Table 5, along with the average foam cell size obtained with each, illustrating the variety of components that can be used in the two-component nucleating agent system of this invention.

TABLE 5

Extrusion Results for Examples 5–8

| Example | Cation | Cell Size (mm) |
|---|---|---|
| 5 | Calcium | 0.20 |
| 6 | Strontium | 0.15 |
| 7 | Barium | 0.08 |
| 8 | Potassium | 0.10 |

Example 9

Die tooling was similar to that of conditions I of Table 2, while temperature profile was similar to that of conditions II. The wire was AWG 24 solid conductor having diameter of 0.020 inch (0.51 mm). Resin used was a TFE/HFP copolymer having nominal MFR of 22 g/10 min at 372° C. (Teflon® FEP fluoropolymer resin grade TE-4100, DuPont). The nucleating agent combination was 800 ppm of BaS-10 and 100 ppm of KTB. Foam (insulation) diameter was 1.12±0.02 mm, capacitance was 137±2 pf/m, dielectric constant was 1.65 corresponding to 33% voids, and average foam cell size was about 0.04 mm.

Example 10

This example illustrates control of the point at which foaming occurs in extrusion foaming, using the nucleating agent system of this invention. The extrusion setup was similar to conditions II of Table 2, except that the die diameter was 3.18 mm, wire preheat temperature was 82° C., screw speed was 12 rpm, a single gas injection port was used, nitrogen pressure was varied as indicated in Table 6, crosshead pressure was 9.5 MPa, wire size was AWG 24 (0.51 mm), wire speed was 113 m/min, and melt cone length was 13 mm. In this instance, a Maillefer 4/6 crosshead was used. These conditions produced a foam insulation structure having a nominal 0.009-inch (0.23-mm) wall thickness. The TFE/HFP copolymer resin of Example 9 was used. The nucleating agent combination was BaS-10 and NaTB in the amounts given in Table 6. For this series of extrusions, the point at which foam cells became visible with the unaided eye was noted and is recorded in Table 6 as "foam distance" measured from the die. The data indicate that the point at which foaming occurs can be varied over a wide range. As also indicated by foam cell dimensions in Table 6, adjustment of sulfonic acid salt and inorganic salt concentrations can yield extremely fine foam structures, with foam cell development occurring safely beyond the melt cone.

TABLE 6

Extrusion Results for Example 10

| Example | 10a | 10b | 10c | 10d | 10e | 10f |
|---|---|---|---|---|---|---|
| Nucleating agent | | | | | | |
| BaS-10 (ppm) | 800 | 800 | 800 | 800 | 2400 | 2400 |
| NaTB (ppm) | 100 | 50 | 50 | 75 | 75 | 100 |
| Running conditions | | | | | | |
| $N_2$ pressure (MPa) | 12.8 | 12.8 | 14.8 | 14.8 | 14.8 | 14.8 |
| Extrudate properties | | | | | | |
| Foam distance (cm) | 5 | 152 | 122 | 23 | 13 | 6 |
| Ave. cell size (mm) | 0.025 | 0.084 | 0.064 | 0.076 | 0.033 | 0.015 |
| Dielectric constant | 1.74 | 1.82 | 1.74 | 1.74 | 1.69 | 1.64 |
| Voids (%) | 25 | 19 | 25 | 25 | 30 | 33 |

EXAMPLE 11

This example pertains to a pressure extrusion (i.e. no melt draw) of Union Carbide polyethylene resin DGD3364NT, details shown in Table 8. The resin was foamed via high pressure nitrogen gas injection. In each case the resin contained 1000 ppm KS-8. In the second case, 100 ppm CaTB was added to the composition. Each additive (KS-8 and CaTB) was compounded into a concentrate also contained enough DuPont polyethylene resin number 20 to yield 2% of this branched resin in the final foam composition. These concentrates were let down with the DGD3364NT at the time of the extrusion foaming. The described 45 mm extruder screw was used in the Nokia-Maillefer extruder in conjunction with a B&H 30 crosshead.

In each extrusion case the polyethylene was foamed to a dielectric constant of 1.55 (a void content of approximately 50%). The average foam core diameter on the 0.403 mm stranded wire was 1.94 mm. The foam cell size remained essentially the same in each extrusion at 0.021 mm in diameter.

The advantage of the CaTB is that it stabilizes the extrusion foaming process. The comparative date in Table 7 show this improvement as reduced variation in insulation diameter (foam core) and reduced variation in capacitance when the inorganic salt is present along with the KS-8.

TABLE 7

Comparison of Extrusion Foaming Stability of Polyethylene 98% DGD3364NT polyethylene and 2% DuPont 20 Polyethylene

| Composition | Variation of Foam Core Average Diam. Over a 60 minute period mm | Variation of Foam Core Av. Capacitance over a 60 minute period pf/m |
|---|---|---|
| 1000 ppm KS-8 | 1.934 to 9.947 (cycling every 6 to 9 minutes) | 55.1 to 55.4 (cycling every 6 to 9 minutes) |
| 1000 ppm KS-8 and 100 ppm CaTB | Steady at 1.945 | Steady at 54.8 |

TABLE 8

Extruder Detail and Extrusion Conditions

| Extruder | |
|---|---|
| Die diameter (mm) | 1.32 |
| Guide tip diameter (mm) | pressure extrusion |
| Temperatures °C. | |
| Rear | 204 |
| Center Rear | 232 |
| Center | 232 |
| Center Front | 246 |
| Front | 260 |
| Clamp | 260 |
| Adapter | 260 |
| Crosshead | 273 |
| Die | 273 |
| Melt | 270 |
| Wire preheat | 54 |
| Running conditions | |
| Screw speed (rpm) | 50 |
| Nitrogen pressure (MPa) | 26.2 |
| Crosshead pressure (MPa) | 19.2 |
| Wire size (AWG) | 26 stranded |
| Wire speed (m/min) | 130 |
| Melt cone length (mm) | pressure extrusion |
| Air gap to water quench (m) | 6 |

What is claimed is:

1. A foamable thermoplastic resin composition, comprising thermoplastic resin and a nucleating agent system consisting essentially of a nucleating effective amount of (a) at least one sulfonic or phosphonic acid or salt thereof and (b) at least one inorganic salt containing a polyatomic anion, said composition being free of boron nitride.

2. The foamable composition of claim 1, wherein said inorganic salt satisfies the relationships $$0.36[14-pKa]-0.52 \geq [r-0.2q]^2 \geq 0.11[14-pKa]-0.28$$

and $$3 \leq [14-pKa] \leq 10$$

wherein:
  r=crystal ionic radius of said cation, in angstrom units
  q=valence of said cation
  pKa=−logKa
  Ka=equilibrium ionization constant of the anion acid.

3. The foamable composition of claim 1, wherein said sulfonic or phosphonic acid or salt is selected from
  (a) free acids and salts of partially or totally fluorinated aliphatic sulfonic and phosphonic acids, which optionally may contain cycloalkyl groups and/or ether oxygen; and (b) free acids and salts of aromatic sulfonic and phosphonic acids in which the aromatic ring, optionally, is substituted with alkyl, fluorine-containing alkyl, and/or hydroxyl groups.

4. The foamable composition of claim 3, wherein said sulfonic or phosphonic acid or salt has the formula $$[Z(CF_2)_x(CF_2CFX)_p(R')_y(CH_2)_zRO_3]_nM$$

wherein:
the bivalent groups, except for $RO_3$, may be present in any sequence;

Z is $CCl_3$, $CCl_2H$, H, F, Cl or Br;

each X, independently, is selected from H, F, Cl and $CF_3$;

R is selected from sulfur and phosphorus;

M is selected from H and a metallic, ammonium, substituted ammonium and quaternary ammonium cation;

each of x and z, independently, is an integer and is 0 to 20;

p is an integer and is 0 to 6;

y is 0 or 1;

x+y+z+p is a positive integer, or, if x+y+z+p is 0, then Z is $CCL_3$ or $CCl_2H$;

n is the valence of M; and

R' is selected from a C5-6 perfluorinated alicyclic ring diradical; a $C_{1-16}$ perfluorinated aliphatic polyether diradical with repeat units selected from $[CF_2O]$, $[CF_2CF_2O]$, and $[CF_2CF(CF_3)O]$; and a substituted or unsubstituted aromatic diradical, in which case Z is H.

5. The foamable composition of claim 1 wherein said resin is melt-fabricable fluoropolymer.

6. The foamable composition of claim 1 wherein said resin is polyolefin.

7. In the process of foaming thermoplastic resin in the presence of at least one sulfonic or phosphonic acid or salt thereof, the improvement comprising carrying out said foaming in the presence of at least one inorganic salt containing a polyatomic anion and the absence of boron nitride.

8. A foam structure produced by the process of foaming thermoplastic resin in the presence of at least one sulfonic or phosphonic acid or salt thereof, the improvement comprising carrying out said foaming in the presence of at least one inorganic salt containing a polyatomic anion and the absence of boron nitride.

9. The foam structure of claim 8, wherein said structure is wire insulation.

10. The foam structure of claim 9, wherein the wall thickness of said wire insulation is from 0.005 inch to 0.020 inch.

11. The foam structure of claim 8, wherein said resin is melt-fabricable fluoropolymer or polyolefin.

* * * * *